United States Patent [19]
Nakagawa

[11] Patent Number: 5,821,946
[45] Date of Patent: Oct. 13, 1998

[54] INTERACTIVE PICTURE PRESENTING APPARATUS

[75] Inventor: Shigeo Nakagawa, Tokyo, Japan

[73] Assignee: NEC Corporation, Tokyo, Japan

[21] Appl. No.: 782,076

[22] Filed: Jan. 13, 1997

[30] Foreign Application Priority Data

Jan. 11, 1996 [JP] Japan .................................. 8-002822

[51] Int. Cl.$^6$ ............................................. H04N 9/79
[52] U.S. Cl. ........................................ 345/473; 345/421
[58] Field of Search ................................... 345/418, 419, 345/421, 473, 423

[56] References Cited

U.S. PATENT DOCUMENTS

| | | | |
|---|---|---|---|
| 5,338,200 | 8/1994 | Olive ....................................... | 345/419 |
| 5,535,374 | 7/1996 | Olive ....................................... | 395/500 |
| 5,657,247 | 8/1997 | Daniel et al. ........................... | 345/473 |
| 5,689,437 | 11/1997 | Nakagawa .............................. | 345/421 |
| 5,741,136 | 4/1998 | Kirksey et al. ......................... | 345/473 |
| 5,742,289 | 4/1998 | Naylor et al. ........................... | 345/473 |

FOREIGN PATENT DOCUMENTS 2216588  8/1990  Japan .

OTHER PUBLICATIONS

"Computer Animation with Scripts and Actors", *Computer Graphics*, vol. 16, No. 3, Jul. 1982, ACM Siggraph, pp. 289–296.

Nakagawa et al., "Character Behavior Description Method on Interactive Animation", the Communication Technical Report of the Information Processing Society of Japan, pp. 2–397, Mar. 1995. (with English abstract).

*Primary Examiner*—Cliff N. Vo
*Attorney, Agent, or Firm*—Sughrue, Mion, Zinn, Macpeak & Seas, PLLC

[57] ABSTRACT

An interactive picture presenting apparatus includes a user input section, an operation data generating section, an operation unit generating section, a scenario editing section, and an interactive picture generating section. The user input section receives a user input. The operation data generating section generates operation data of the objects on the basis of layouts of the objects for each frame. The operation unit generating section generates, on the basis of the user input from the user input section, an operation unit constituted by the operation data from the operation data generating section and a start condition of the operation data. The scenario editing section generates, on the basis of the user input from the user input section, a scenario using the operation unit from the operation unit generating section and an execution order of operation units. The interactive picture generating section calculates the layout of each object on the basis of the scenario from the scenario editing section and the user input from the user input section for each frame, generates a picture on the basis of the calculated layout of each object for each frame and geometric attributes of each object, and outputs the calculated layout of each object for each frame to the operation data generating section.

13 Claims, 12 Drawing Sheets

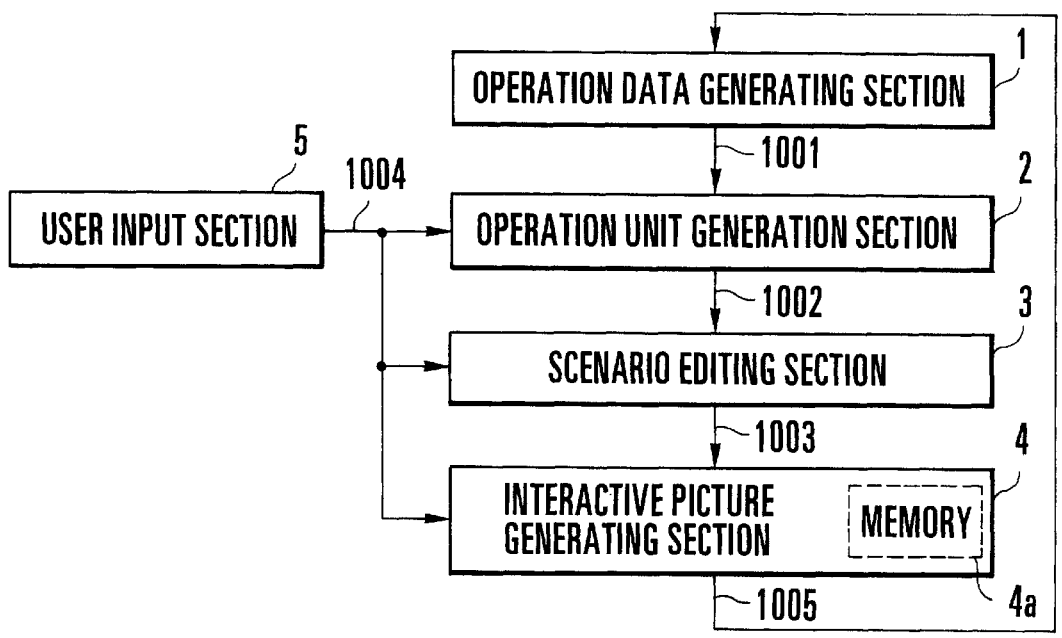
F I G. 1
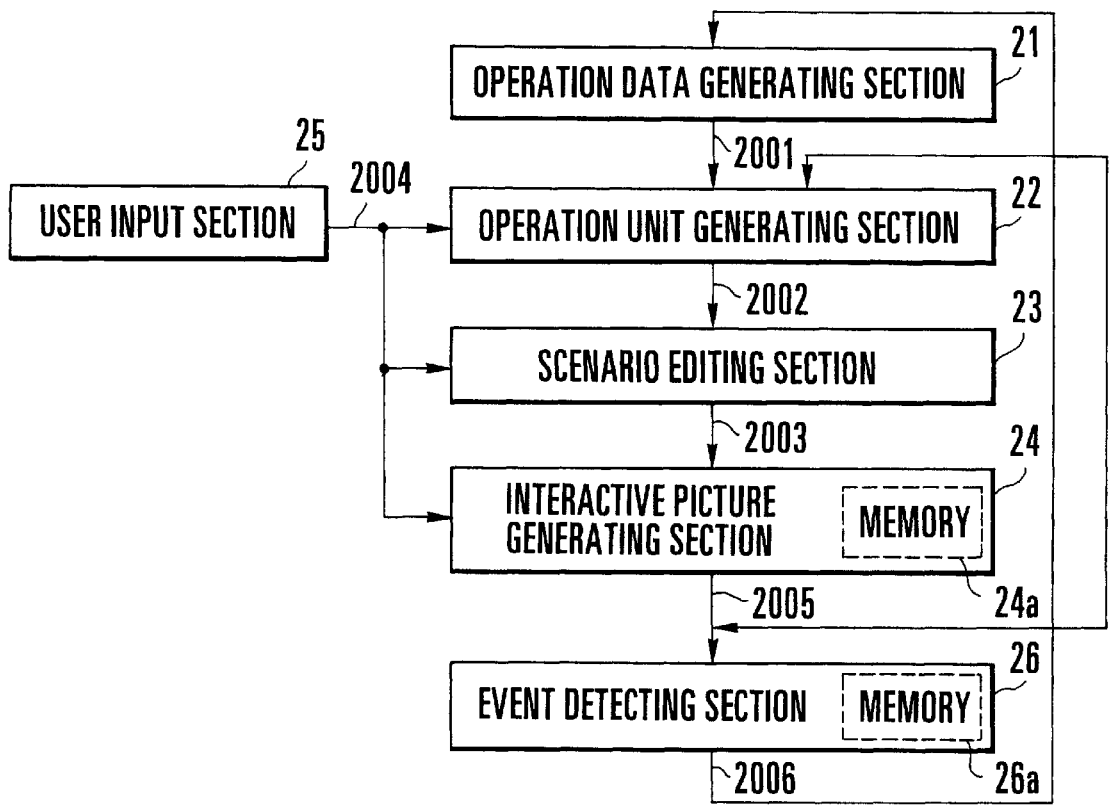
F I G. 2

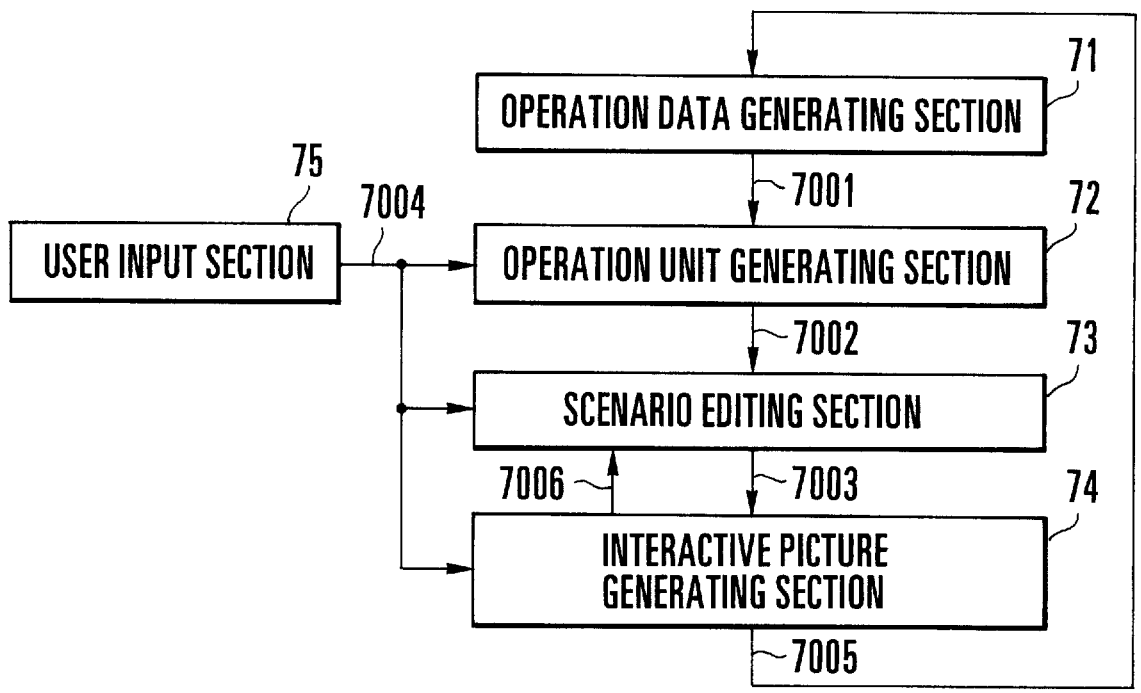
F I G. 7
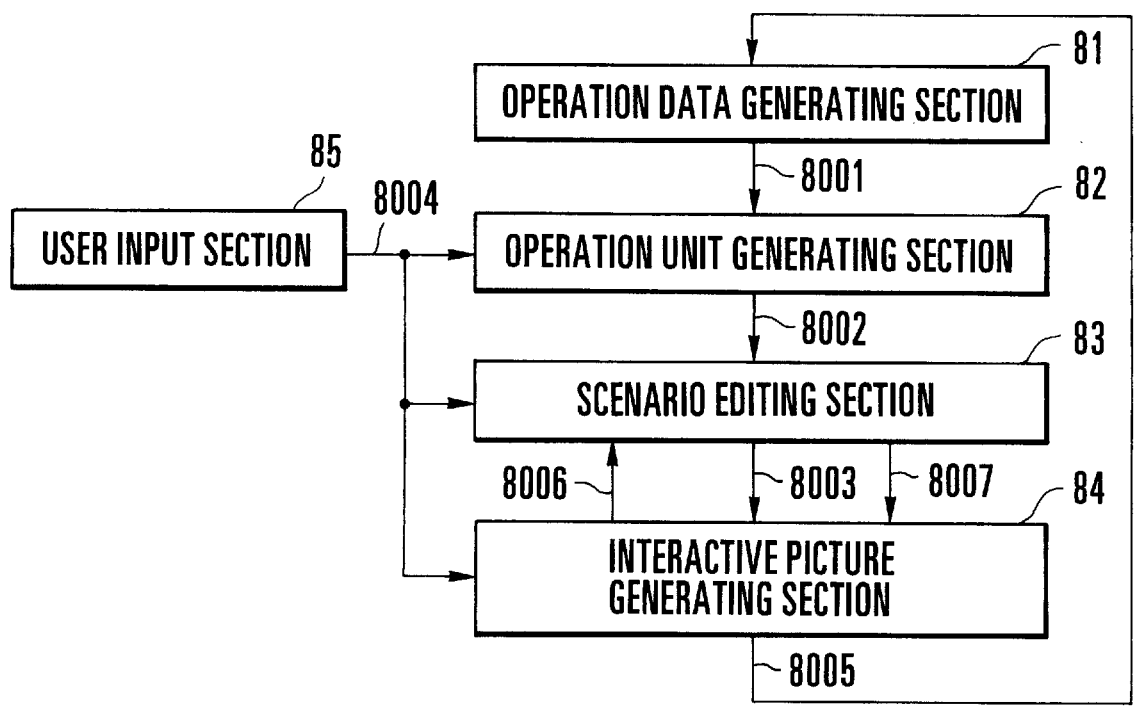
F I G. 8

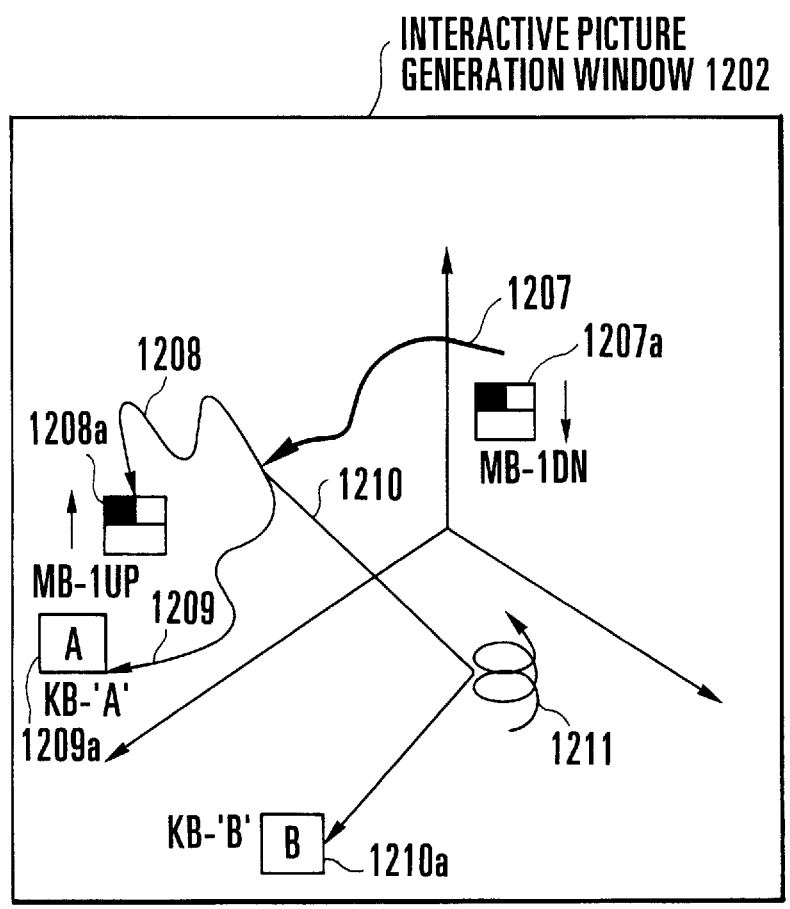
F I G. 12B

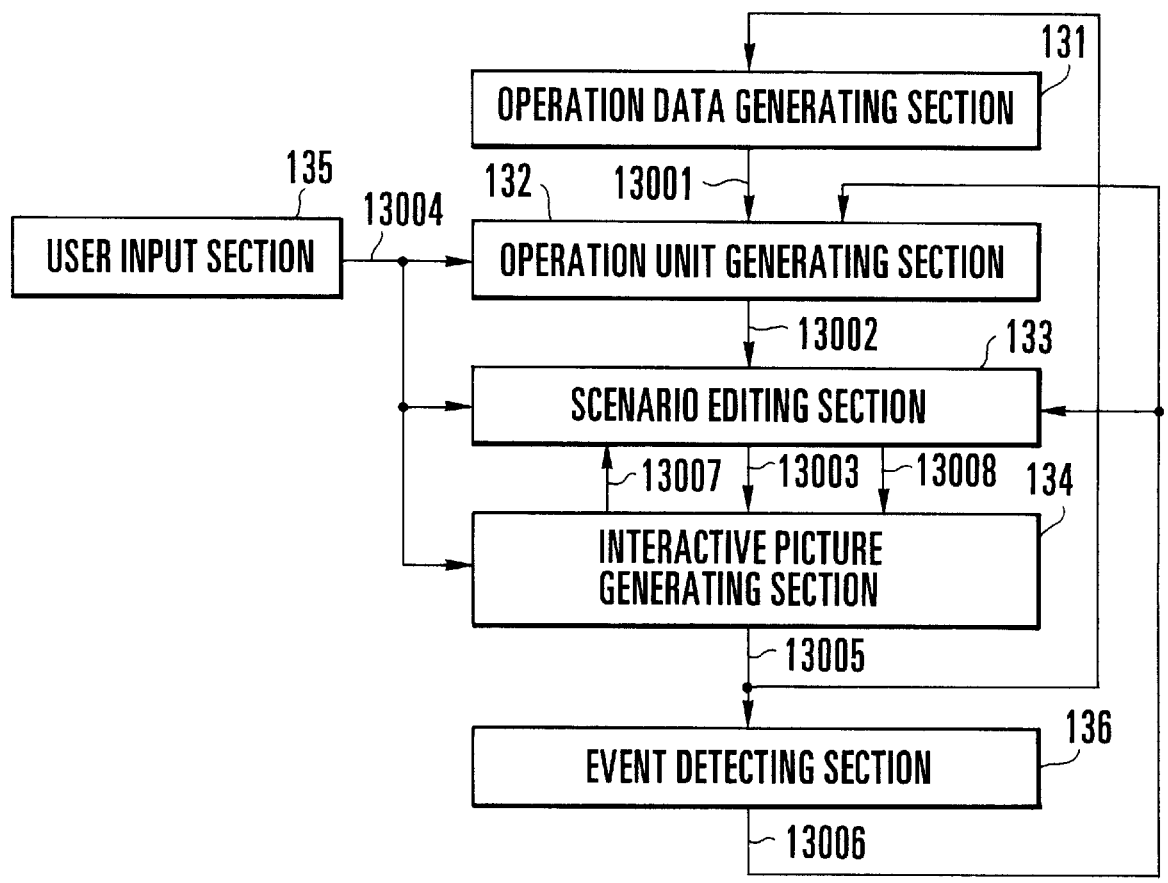
F I G. 13

INTERACTIVE PICTURE PRESENTING APPARATUS

BACKGROUND OF THE INVENTION

The present invention relates to an interactive picture presenting apparatus for generating and presenting a real-time animation picture changing in accordance with a user's operation.

An interactive 3D computer graphics (CG) animation capable of changing the behavior or operation of a character in an animation in response to a user's input operation can be realized by generating a 3D CG picture in real time.

Application examples of interactive 3D CG animations for interactive operations with users include a 3D CG game, a flight/driving simulation, a walk-through simulation in which the viewpoint changes inside a building, and a visual presentation for a 3D structure such as a mechanical/human/molecular structure.

As a method of describing an interactive animation and a non-interactive animation which does not perform an interactive operation with a user, a script animation technique is known in which the behavior or operation of an actor and its change sequence which are externally input are described with an animation dedicated program language called a script. In the script animation technique, the start condition of the operation of the actor can be locally described, so that an animation constituted by a plurality of actors can be easily described.

An example of the script animation technique is described in Craig W. Reynolds, "Computer Animation with Scripts and Actors", Computer Graphics, Vol. 16, No. 3, July 1982, ACM SIGGRAPH, pp. 289–296 (Reference 1).

According to another interactive animation description scheme, a series of behaviors or operations of an actor and the execution of the series of behaviors or operations are described by a connection list of data called an "operation (action) unit". This connection list is called as an "operation (action) unit list". One "operation unit" is data as a set of the behavior or operation of an actor and its start condition. In execution of an interactive animation, operation units satisfying the start conditions are executed in the connection order of operation units. The interactive animation description scheme using the operation data list will be called an operation unit list method.

An example of the operation unit list method is described in Nakagawa et al., "A Character Behavior Description Method on Interactive Animation", the Communication Technical Report of the Information Processing Society of Japan, pp. 2–397, March 1995 (Reference 2).

In the operation unit list method, a series of operations are described by arranging the unit data in the execution order on the basis of the unit data which can be intuitively grasped by an interactive animation designer as the "cause and result of one operation". For this reason, the total operational flow can be easily grasped, resulting in an advantage.

The description of the operation unit and its sequence can also advantageously be realized by a visual programming technique (iconic programming) including generation, layout, and connection of icons in addition to programming using text editing.

A script animation generating method is described in Japanese Patent Laid-Open No. 2-216588 (Reference 3). In order to describe an actor's behavior or motion, settings for the type, start condition, and sequence of the operation are described in a script with text editing. Some of operation parameters in the script such as an operation start/end position can be set on the animation tool side. This method can be applied to only a normal interactive animation which does not perform an interactive operation with a user and cannot generate an interactive animation which is an object of the present invention.

To determine the behavior or operation sequence of an actor in a conventional interactive animation, after all operation data of characters are generated in advance, a start condition corresponding to each operation data is described as a script. More specifically, even if the start condition of a given operation is known in advance in generating the operation data (e.g., the collision between an actor and a wall is known as a start condition in advance), all the operation data of the actors which include the specific operation must be generated, and the start conditions corresponding to the operation data must be set.

As a result, since each two-stage job step is performed in two stages, the management step of maintaining the correlation between each operation and a start condition is required. In addition, an operation data generating section is conventionally independent of an operation sequence generating section, and no correlation is established between the user's operation and the data contents. Therefore, the operation efficiency of a script describing section serving as the operation sequence generating section is greatly degraded because the animation tool serving as the operation data generating section must search operation data corresponding to a specific start condition every time the correlation therebetween is to be established.

SUMMARY OF THE INVENTION

It is an object of the present invention to provide a means for simplifying or automating a job for setting the correlation between an actor's operation and a start condition, giving a correlation to the operation between an operation data generating section and an operation sequence generating section and to a display, and as a result, generating an interactive animation in the smaller number of steps than that in a conventional case.

In order to achieve the above object of the present invention, there is provided an interactive picture presenting apparatus for presenting a series of pictures by arranging a plurality of objects in a space and generating images of the objects for each frame, comprising user input means for receiving a user input, operation data generating means for generating operation data of the objects on the basis of layouts of the objects for each frame, operation unit generating means for generating, on the basis of the user input from the user input means, an operation unit constituted by the operation data from the operation data generating means and a start condition of the operation data, scenario editing means for generating, on the basis of the user input from the user input means, a scenario using the operation unit from the operation unit generating means and an execution order of operation units, and interactive picture generating means for calculating the layout of each object on the basis of the scenario from the scenario editing means and the user input from the user input means for each frame, generating a picture on the basis of the calculated layout of each object for each frame and geometric attributes of each object, and outputting a calculated layout of each object for each frame to the operation data generating means.

BRIEF DESCRIPTION OF THE DRAWINGS

FIG. 1 is a block diagram showing an interactive picture presenting apparatus according to the first embodiment of the present invention;

FIG. 2 is a block diagram showing an interactive picture presenting apparatus according to the second embodiment of the present invention;

FIG. 7 is a block diagram showing an interactive picture presenting apparatus according to the seventh embodiment of the present invention;

FIG. 8 is a block diagram showing an interactive picture presenting apparatus according to the eighth embodiment of the present invention;

FIGS. 12A and 12B are views showing window display contents for a scenario editing section and an interactive picture generating section shown in each of FIGS. 5 and 6; and FIG. 13 is a block diagram showing an interactive picture presenting apparatus according to the ninth embodiment of the present invention.

DESCRIPTION OF THE PREFERRED EMBODIMENTS

Figure 3:
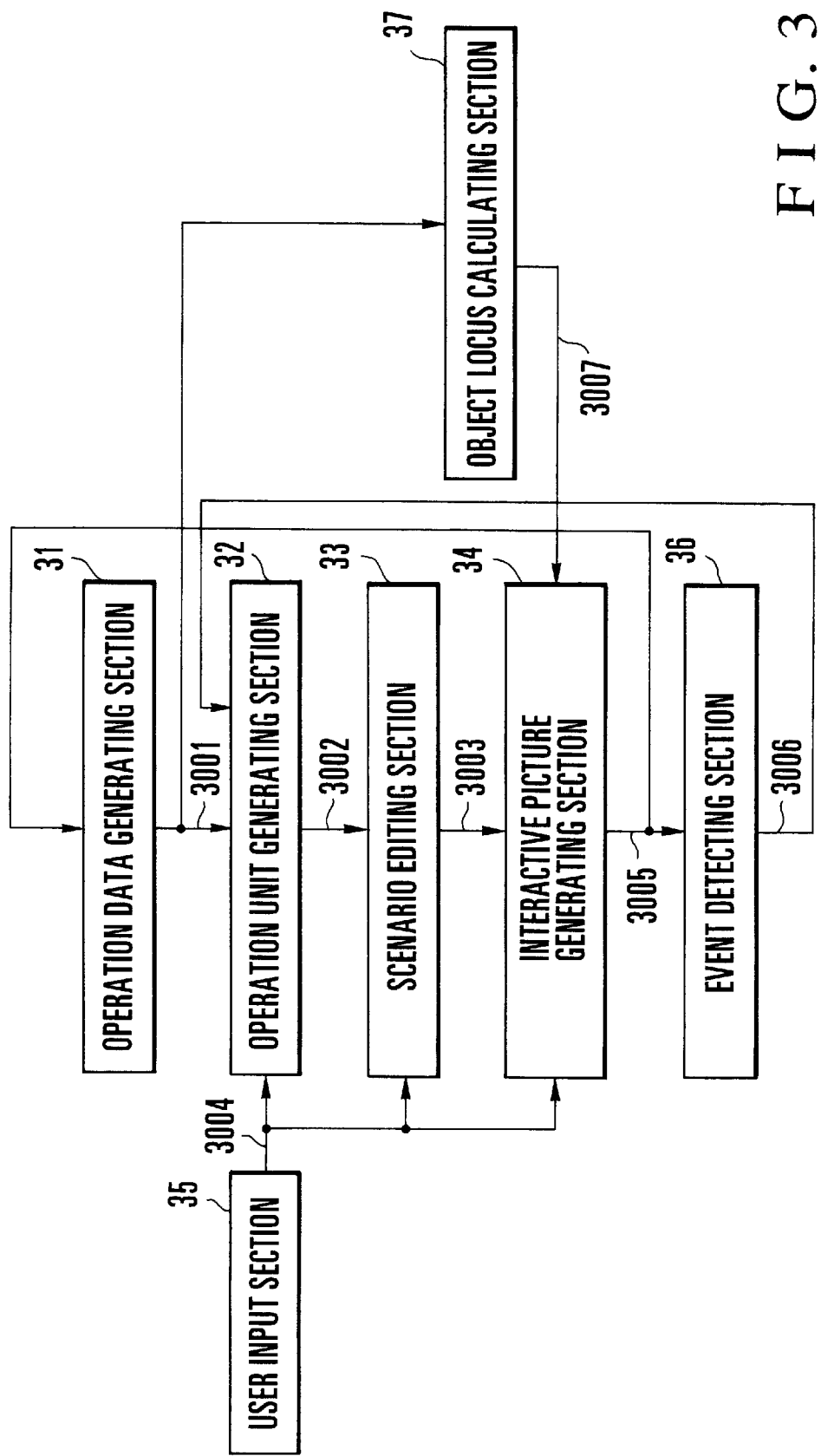
FIG. 3 is a block diagram showing an interactive picture presenting apparatus according to the third embodiment of the present invention.

FIG. 1 shows an interactive picture generating apparatus according to the first embodiment of the present invention. The interactive picture generating apparatus of the first embodiment comprises an operation data generating section 1, an operation unit generating section 2, a scenario editing section 3, an interactive picture generating section 4, and a user input section 5. The operations of the respective constituent components will be described below. In this embodiment, a light source and a viewpoint in this embodiment are defined as actors having specific geometric attributes such as luminous intensity distribution characteristics and visual field characteristics as in the conventional cases.

The user input section 5 receives data output from a mouse or keyboard operated by a user and outputs a user input 1004. The data received by the keyboard or the like can be data obtained when the user operates a keyboard, a mouse, or a 3D coordinate input device, data prestored in a storage device such as a magnetic tape or a magnetic disk, data generated by another program running on the same computer as the picture generating apparatus and stored in a memory, or data obtained as a communication result with another computer or picture generating apparatus connected to a communication line.

The operation data generating section 1 stores as finite time-series data object position data representing the layout (position and rotation) of an actor in a space and outputs operation data 1001 of the actor. The operation data 1001 can be expressed, e.g., as a series of sampling values for each frame time (1/30 sec) of the hierarchical relationship between a coordinate system to which the actor belongs and the world coordinate system, and the positional relationship between these coordinate systems (translation, rotation, and scaling).

As an example, motions are expressed by sampling records ($M(t_1)$, $M(t_2)$, ..., $M(t_{n-1})$, $M(t_n)$) at frame times ($t_1$, $t_2$, ..., $t_{n-1}$, $t_n$) by a homogeneous coordinate matrix M for performing translation, rotation and scaling (enlargement or reduction) from the object coordinate system to which the actor belongs to an upper coordinate system, and for combining translation, rotation, and scaling. The hierarchical relationship of the actor is added to these motions to define operation data. The frame interval is, for example, the field time (1/60 sec) or frame time (1/30 sec) of TV broadcast scheme (NTSC (National Television System Committee) scheme), thereby generating a picture having a smooth motion. At this time, the start and end of the time-series data can be designated together with object position data 1005 by the user. When the user inputs a recording start instruction, the operation data generating section 1 starts recording the input time-series data and continues recording until a recording end instruction is input.

In order to represent the motion of an actor, a correspondence relation D(t) equivalent to the homogeneous coordinate matrix may be defined at time t by a function D using the time t as a parameter. A combination of the function D and the parameter t may be defined as the motion of the object, and the hierarchical relationship may be added to the combination, thereby obtaining operation data. For example, the motion of an object may be described by a spline curve function (D) and its input parameter (t).

In addition, an object having articulated parts, such as a human body, may be used. Alternatively, when an actor is constituted by a plurality of hierarchical parts, operations respectively corresponding to the connections between these parts may be defined, thereby defining the operation data of this actor in accordance with the set of motion information. In particular, in an object having articulated parts, the operation may be described in accordance with a time change in rotation angle of a joint between object coordinate systems which define the articulated parts.

Further, parameters for changing actor's geometric attributes (e.g., a color/luminance value, a shape, a texture image, and a correlation between the shape and the texture image) as function of time may be described as the operation data. For example, when an actor is to be deformed using linear transform such as affine transform, the deformation can be described by the set of affine transform matrices described in the time-series order.

The actor's operation data described above can be described by only an input parameter if a motion calculation algorithm is fixed. To occasionally change the calculation algorithm, an algorithm or a combination of information representing the type of algorithm and a parameter may be used as the operation data.

In order to synchronize the operation of a given actor with those of remaining actors in an interactive animation, message transmission operations for the remaining actors may serve as the operation data. In this case, the execution result of an actor operation is output as a message to realize message communication between the actors. An actor serving as a transmission target and the transmission message contents are designated by menu selection or keyboard input to set the message transmission operation.

On the basis of the user input 1004, the operation unit generating section 2 generates and outputs an operation unit 1002 using the operation data 1001 from the operation data generating section 1 and the start condition of the operation data 1001. An operation unit under execution is presented to the user using a partial script or an icon image. The operation unit generating section 2 may have an internal area for storing an operation unit under execution. The start condition of the operation unit 1001 is described as a function of receiving an event input from the keyboard or mouse operated by the user. At this time, the value to be input to the function need not be an event input by the user, but may be a message input from another actor in the interactive animation.

Figures 10A, 10B:
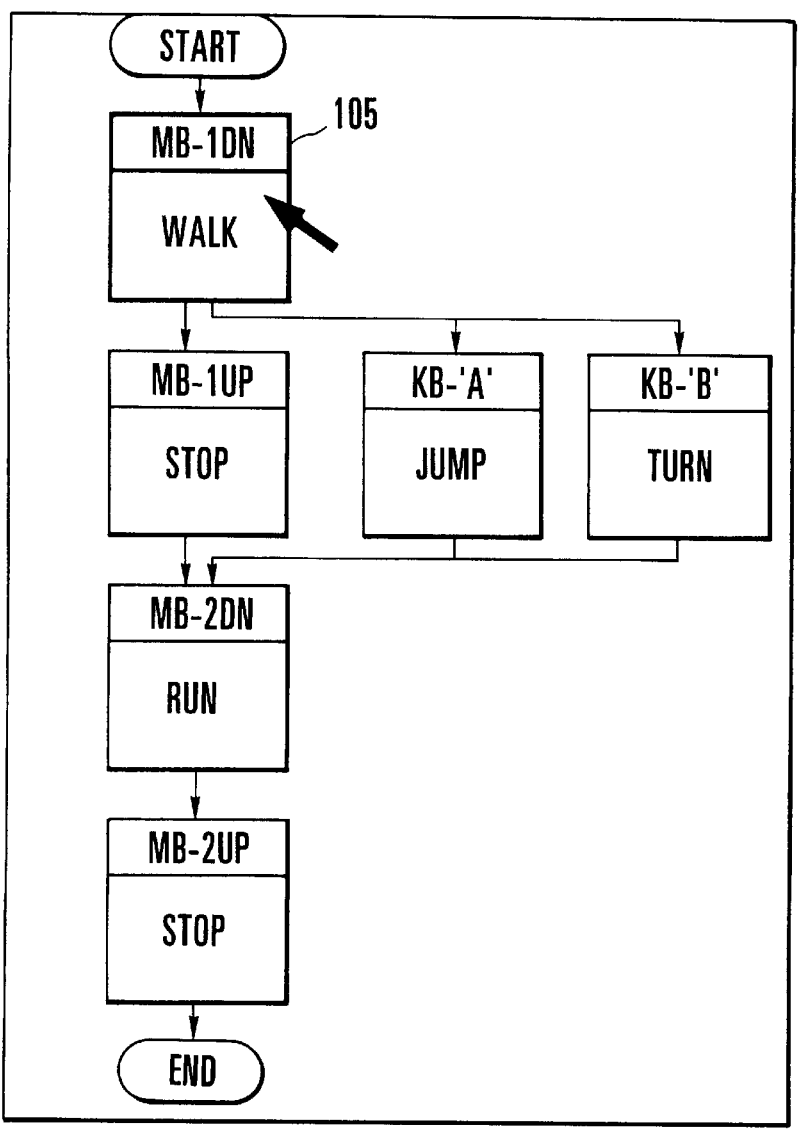
FIGS. 10A and 10B are views showing window display contents for a scenario editing section and an operation unit generating section shown in FIG. 1.

One operation unit is generated by combining one operation data with one start condition. The start condition can be directly input by the user. Alternatively, the types of events and functions are prepared in advance, and choices are displayed in a menu. The user can select a desired one of the choices. FIG. 10A shows a window example for generating an operation unit in user's menu selection. In this case, an event "UP" of button 2 of a mouse is selected as a start condition 101, and "WALK" of operation 2 is selected to be executed as operation data 102. As a result, an operation unit 104 as an operation unit 103 is generated.

On the basis of the user input 1004, the scenario editing section 3 edits and outputs a scenario 1003 constituted by the operation unit 1002 from the operation unit generating section 2 and the execution order. The scenario editing section 3 has an internal area for storing a scenario. The scenario editing section 3 also edits and generates a scenario while presenting this scenario to the user. The execution order of the operation units 1002 is described by a method of laying out partial scripts from the operation unit generating section 2 in the execution order to obtain a new script, adding a control structure corresponding to the if- and for-statements in, e.g., the C language, and setting execution branches and repetitions between the respective operation units.

Another method of describing the execution order of the operation units 1002 is to describe the execution order in the same manner using a list (operation unit list) whose operation units are connected in an execution order or using a directed graph. Such an operation unit list method is described in Reference 2 described above.

Figure 9:
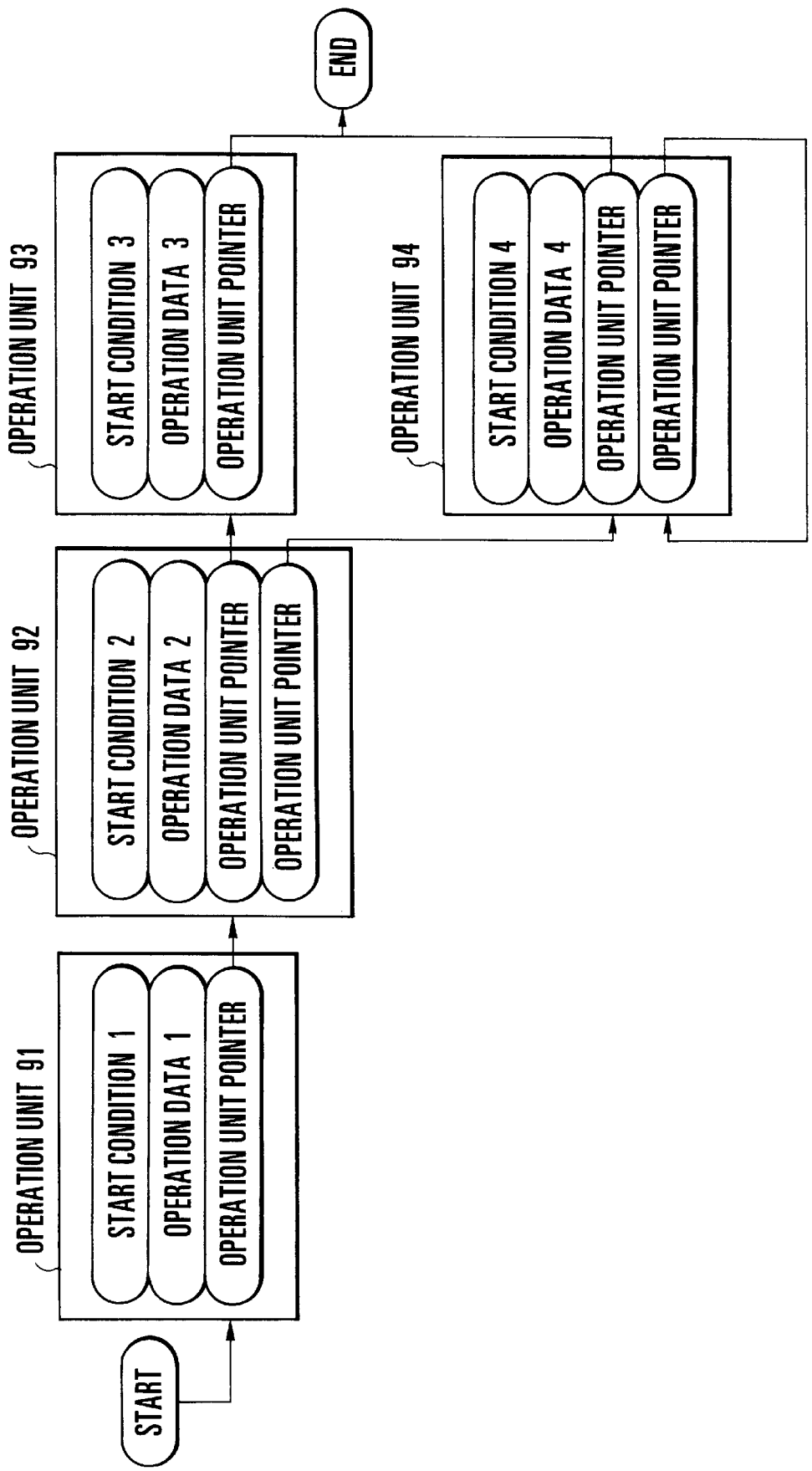
FIG. 9 is a view for explaining an operation unit list.

FIG. 9 explains an operation unit list. The operation unit list consists of a plurality of operation units 91 to 94 and their pieces of connection information (links). The operation units 91 to 94 comprise start conditions 1 to 4, operation data 1 to 4, and operation unit pointers serving as the pieces of connection information. The operation unit list expresses the sequential execution order of operations. However, when conditional branch control or repetition control are performed in executing the operation units, a plurality of connection information and a plurality of operation units are connected for one operation unit, thereby describing a conditional branch or repetition.

The scenario editing section 3 displays the respective icons for the plurality of operation units on the screen. When the user wants to set the execution order between the operation units and connect the operation units, icons are displayed on the screen, and the user shifts or positions the operation unit icons. In addition, a display operation for setting a link between the operation unit icons is also performed.

The icon display operation will be described with reference to FIG. 10B. FIG. 10B shows a window for generating and editing an operation unit list in accordance with a visual programming technique known as iconic programming. Referring to FIG. 10B, reference numeral 105 denotes an operation unit icon as a target object that the user currently edits. The user newly adds an icon to the target editing object or deletes it from the object and can set a connection line to set the execution order between icons.

The operation sequence of the actors in the scenario editing section 3 can be set using the iconic programming technique described above. At this time, the name or type of operation data and the start condition of the operation data are described together with the operation unit icon, thereby identifying the icon.

The scenario 1003 edited by the scenario editing section 3 may be input from or output to an external storage means. For example, a scenario already generated or currently edited may be temporarily stored in an external storage device or may be stored from the external storage device to the internal storage in the scenario editing section 3. To output an operation unit list as a file to the external storage device, different index numbers are uniquely assigned to all the operation units constituting the operation unit list, so that connection information between the operation units can be described using each index number.

An operation for describing the scenario 1003 in an operation unit list will be described below. The interactive picture generating section 4 calculates the layout (position and rotation) of an actor in a space for each frame on the basis of the scenario 1003 and the user input 1004 and generates a picture on the basis of the calculated layout and the geometric attributes of the actor which are stored in an internal memory 4a. At the same time, the interactive picture generating section 4 outputs the calculated layout for each frame as the object position data 1005 to the operation data generating section 1.

The geometric attributes are the shape of an actor, the luminance and material of a shape surface, a texture image to be texture-mapped, and the correlation between the texture image and the shape surface. The shape data of the actor is described by, e.g., coordinate data of a polygon in an object coordinate system or control point data of a spline curve. The material of the shape surface of the actor is described by a color/luminance value and a reflectance. When an actor is constituted by hierarchical parts connected to each other, such as an object having articulated parts, the management information of a hierarchical relationship and the positional relationship between parts of the actor are described as geometric attributes.

The geometric attributes stored in the memory 4a of the interactive picture generating section 4 may be input from or output to the external storage device. For example, in generating a picture, the geometric attributes may be transferred from the external storage device to the memory 4a of the interactive picture generating section 4 and stored therein.

The layout of an actor in the space can be calculated as follows on the basis of the scenario 1003 and the user input 1004. As initial processing, the operation of the first operation unit (initial operation unit) in the operation unit list in the scenario 1003 is read out from the scenario. The operation of the initial operation unit is unconditionally executed, and an operation unit connected to the initial operation unit is read out. When a plurality of operation units are connected to the initial operation unit, all the operation units are read out.

Every time an event (e.g., collision, a timeout, and a message from another actor) serving as a user input or a start condition input is input, it is repeatedly determined which one of the readout operation unit start conditions is established. When one of the start conditions is established, the corresponding operation unit is executed, and an operation connected to this executed operation unit is read out. The start conditions are then evaluated. A series of these operations are repeated.

During execution of the operation, the interactive picture generating section 4 calculates the layout of the actor such as the position, rotation, and scaling for each frame time on the basis of the operation data and generates an image in real time on the basis of the calculated layout, thereby presenting a picture to the user. In image generation, image generation processing is performed using a series of 3D computer graphics techniques such as coordinate transform, clipping, luminance calculation, perspective projection calculation, shading, and hidden surface removal processing on the basis of the viewpoint, the light source, the position and shape of an actor in the space, and the surface attributes of the actor.

The layout of an actor may be calculated not only by the operation data, but also the user input 1004 based on a user's real-time operation. For example, the user can directly manipulate the actor by, e.g., a method of calculating the layout of the actor in such a manner that translation or 3-axis rotation of the actor in the space is weighted for the original actor's operation data on the basis of the real-time user input 1004. As an example, an actor corresponding to a viewpoint or camera is changed in real time when the user manipulates a 3D input device, thereby realizing an application such as a walk-through simulation in which the position of the viewpoint changes inside a building.

The layout data including the hierarchical relationship calculated as described above for all the objects for each frame time are output from the interactive picture generating section 4 to the operation data generating section 1 as the object position data 1005 in the space. If the hierarchical relationship in the space is permanent, the hierarchical relationship is output once for the first time, and only the layout for each frame time in the hierarchical level to which the actor currently belongs may be output. In this case, when the hierarchical relationship is changed by the user, a hierarchical relationship which reflects the change is output to update the current hierarchical relationship.

FIG. 2 shows an interactive picture presenting apparatus according to the second embodiment of the present invention. The apparatus of the second embodiment is characterized in that an event detecting section 26 is added to the apparatus of the first embodiment shown in FIG. 1. An operation unit generating section 22 sets a start condition on the basis of an event detected by the event detecting section 26, and an operation unit 2002 is generated on the basis of an automatic operation or a semi-automatic operation including a selection operation by a user. The operations of the event detecting section 26 and the operation unit generating section 22 will be described below in detail, and the same description as in FIG. 1 will be omitted.

The event detecting section 26 has a memory 26a for storing the geometric attributes of actors. The event detecting section 26 detects an event 2006 from object position data 2005 output from an interactive picture generating section 24 and outputs the detected event 2006 to the operation unit generating section 22. The event 2006 can be various events such as a collision event between actors, a user input event, and a timeout event which are generated in executing interactive picture generation.

The event detecting section 26 calculates on the basis of the geometric attributes of actors and the object position data 2005 whether a plurality of actors collide or interfere with each other. If the collision or interference is detected, the names of actors colliding with each other and the collision position are output as the event 2006. The geometric attributes of the actors may be read out from an external storage means first as part constituting the object position data 2005, or from a memory 24a of the interactive picture generating section 24.

A counter is arranged in the event detecting section 26 to detect the lapse of time, and a counter value is used for global time lapse management of an interactive animation by incrementing the counter value of the counter every lapse of the frame time. In this case, it is determined whether the set time has elapsed from the start of a given operation. When the set time has elapsed, a timeout event 2006 is output.

The object position data 2005 including a user input 2004 may be input to the event detecting section 26, and the event detecting section 26 may output a user manipulation result event 2006. The event detecting section 26 outputs each detected event or count value as the event 2006 to the operation unit generating section 22.

The operation unit generating section 22 sets a start condition having the event 2006 as an input and generates the operation unit 2002 in combination with operation data 2001 upon setting the start condition. A method of generating the operation unit 2002 is a method of automatically combining the event 2006 detected by the event detecting section 26 with the operation data 2001 generated immediately after the event 2006. Alternatively, the detected event 2006 may be combined with the already generated operation data 2001 in menu selection by the user. Reference numeral 21 denotes an operation data generating section; 23, a scenario editing section; 24, the interactive picture generating section; 25, a user input section; and 2003, a scenario.

FIG. 3 shows an interactive picture presenting apparatus according to the third embodiment of the present invention. The apparatus of the third embodiment is characterized in that an object locus calculating section 37 is added to the apparatus of the second embodiment shown in FIG. 2. The operation of the object locus calculating section 37 will be described in detail below. On the basis of operation data 3001 calculated by an operation data generating section 31, the object locus calculating section 37 calculates the figure or 3D shape for visualizing the locus or rotation amount of an actor in a space as an object locus 3007 and outputs the object locus 37 to an interactive picture generating section 34. The shape representing the locus can be expressed as a series of lines or a curve which connects spatial object positions sampled every predetermined period of time. The calculated object locus 3007 is presented as a picture in the interactive picture generating section 34.

The object locus calculating section 37 generates the translation component, i.e., the locus shape of stop points of an actor, of the operation data 3001 and outputs it as the object locus 3007. The object locus calculating section 37 similarly generates as a locus shape the rotation amount component (e.g., as a numerical display of a rotation angle or an icon display indicating the rotation angle of a circle graph shape) of the operation data 3001 and outputs the generated rotation amount component as the object locus 3007. When translation and rotation are to be simultaneously performed or combined, the resultant display figures are combined and displayed as the object locus 3007. In addition to execution of the scenario of an actor on the basis of a real-time user input 3004 from a user input section 35, the interactive picture generating section 34 generates and presents the object locus 3007 as a picture. Reference numeral 32 denotes an operation unit generating section; 33, a scenario editing section; 36, an event detecting section; 3002, an operation unit; 3003, a scenario; 3005, object position data; and 3006, an event.

Figure 4:
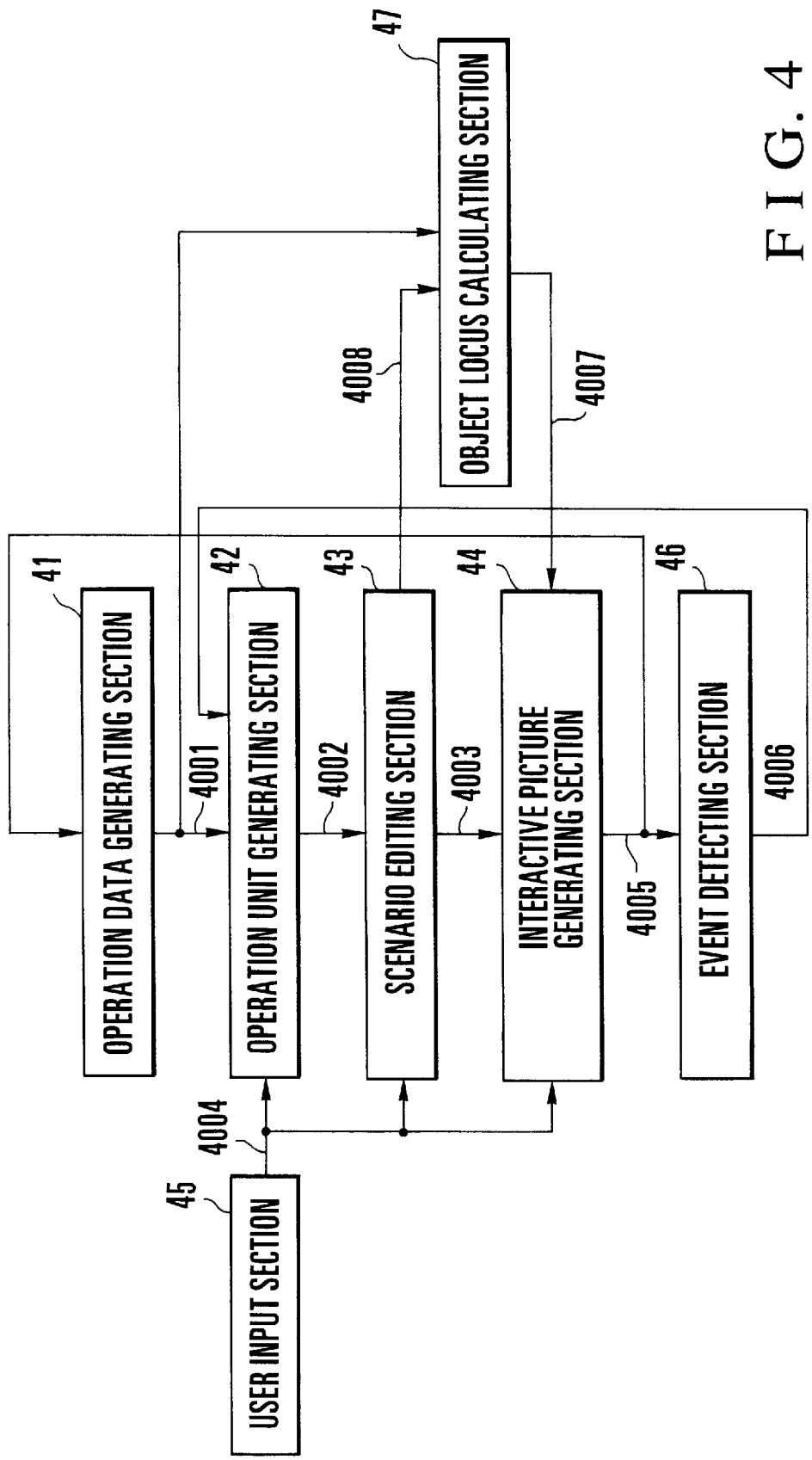
FIG. 4 is a block diagram showing an interactive picture presenting apparatus according to the fourth embodiment of the present invention.

FIG. 4 shows an interactive picture presenting apparatus according to the fourth embodiment of the present invention. The apparatus of the fourth embodiment is characterized in that editing indices 4008 for designating one or a plurality of operation units serving as editing targets in a scenario editing section 43 are output to an object locus calculating section 47. The object locus calculating section 47 emphasizes to display an object locus 4007 for operation data serving as a target on the basis of editing indices 4008. The operations of the scenario editing section 43 and the object locus calculating section 47 will be described below in detail.

When the user wants to edit an operation unit using the scenario editing section 43, the scenario editing section 43 outputs as the editing indices 4008 indices of operation units serving as the editing targets to the object locus calculating section 47. The object locus calculating section 47 changes a motion feature such as a color/luminance value corresponding to each editing index 4008 and gives an attribute to flicker a display, thereby designating to emphasize the display. In addition to execution of the scenario of an actor, an interactive picture generating section 44 generates and presents the object locus 4007 from the object locus calculating section 47 as a picture on the basis of a real-time user input 4004 from a user input section 45.

Figure 11B:
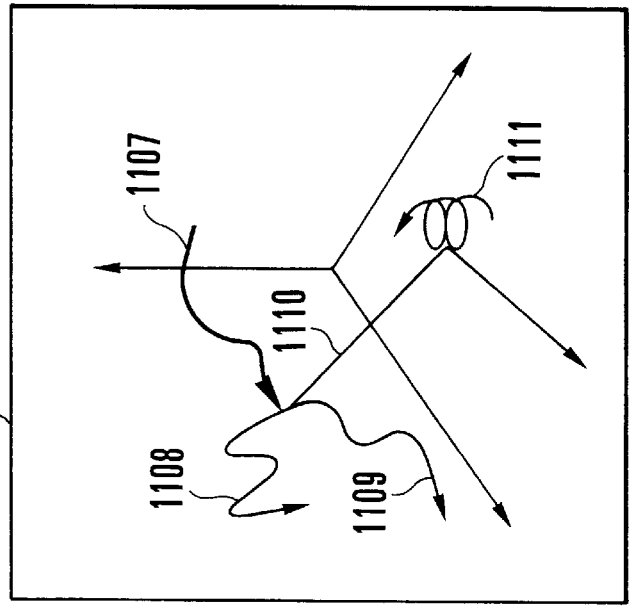
FIGS. 11A and 11B are views showing window display contents for a scenario editing section and an interactive picture generating section shown in each of FIGS. 3 and 4.
Figure 11A:
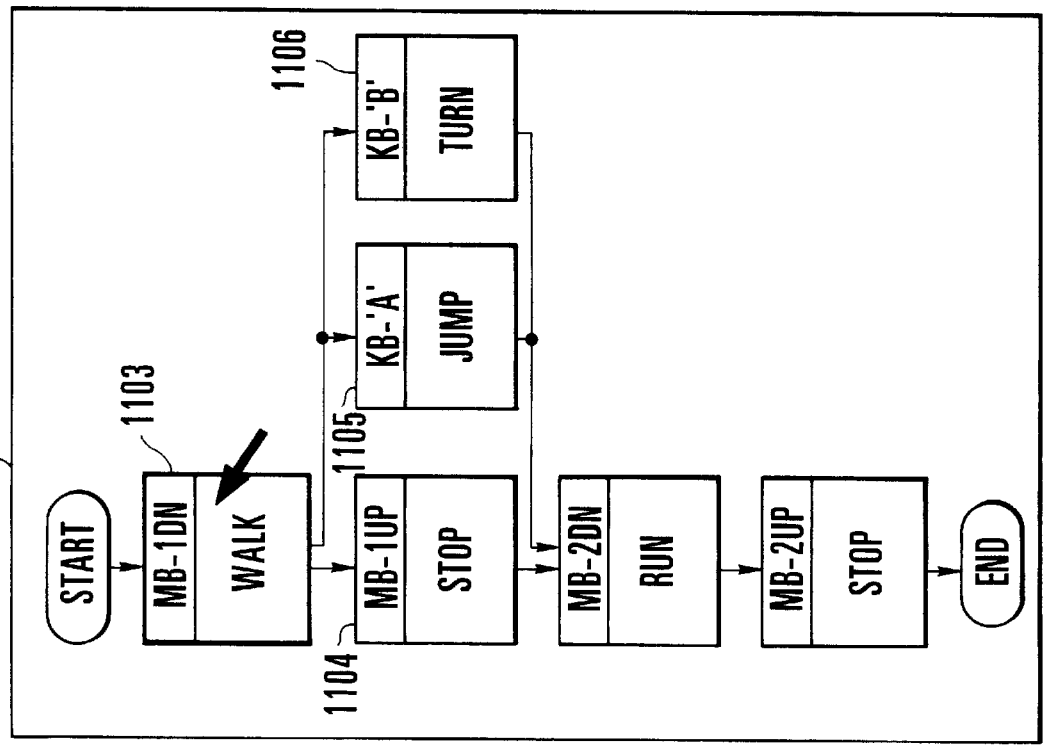

As shown in FIG. 11A, an operation unit 1103 serving as an editing target on a window 1101 for the scenario editing section 43 is emphasized and displayed as an object locus 1107 in a window 1102 for the interactive picture generating section 44. As shown in FIG. 11B, object loci 1108, 1109, and 1110 respectively corresponding to operation units 1104, 1105, and 1106 are also simultaneously displayed in the window 1102. The object locus 1110 is subjected rotation during movement, so that a helical graphic symbol 1111 representing a rotation amount is also marked near the object locus 1110. Reference numeral 41 denotes an operation data generating section; 42, an operation unit generating section; 46, an event detecting section; 4001, operation data; 4002, an operation unit; 4003, a scenario; 4005, object position data; and 4006, an event.

Figure 5:
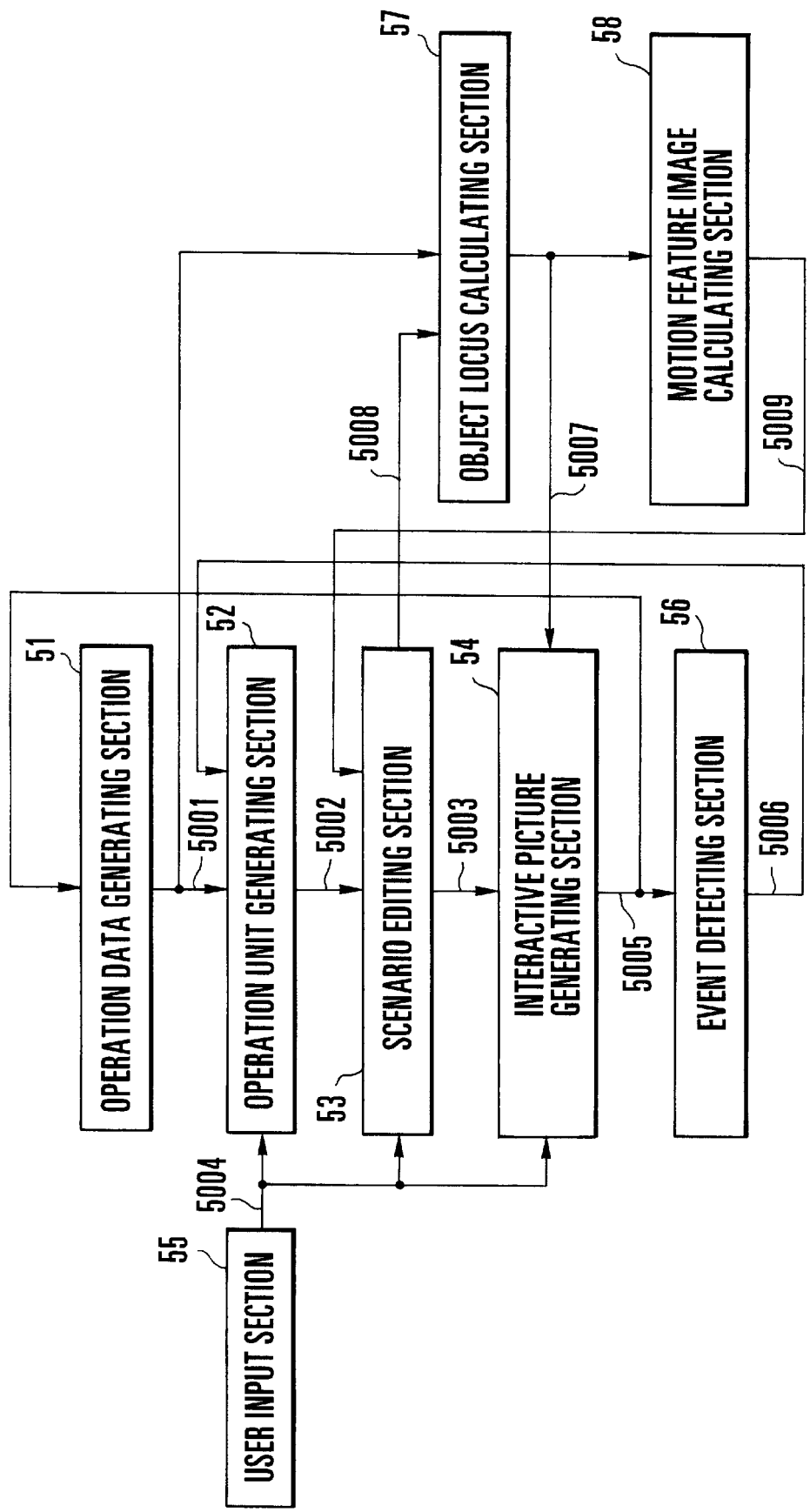
FIG. 5 is a block diagram showing an interactive picture presenting apparatus according to the fifth embodiment of the present invention.

FIG. 5 shows an interactive picture presenting apparatus according to the fifth embodiment of the present invention. The apparatus of the fifth embodiment is characterized in that a motion feature image calculating section 58 is added to the apparatus of the fourth embodiment shown in FIG. 4. The operation of the motion feature image calculating section 58 will be described below in detail.

The motion feature image calculating section 58 renders an object locus 5007 from an object locus calculating section 57 as an image for each operation data and outputs a set of the rendered image and the corresponding operation data index as a feature image 5009 to a scenario editing section 53. The motion feature image 5009 can be an image which expresses the shape or rotation amount of an object locus as in a picture generated in the interactive picture generating section of the third or fourth embodiment. In operation unit editing, the scenario editing section 53 refers to the operation data index of the motion feature image 5009 and displays a corresponding operation unit 5002 together with the motion feature image. Reference numeral 51 denotes an operation data generating section; 52, an operation unit generating section; 54, an interactive picture generating section; 55, a user input section; 56, an event detecting section; 5001, operation data; 5003, a scenario; 5005, object position data; 5006, an event; and 5008, an editing index.

Figure 12A:
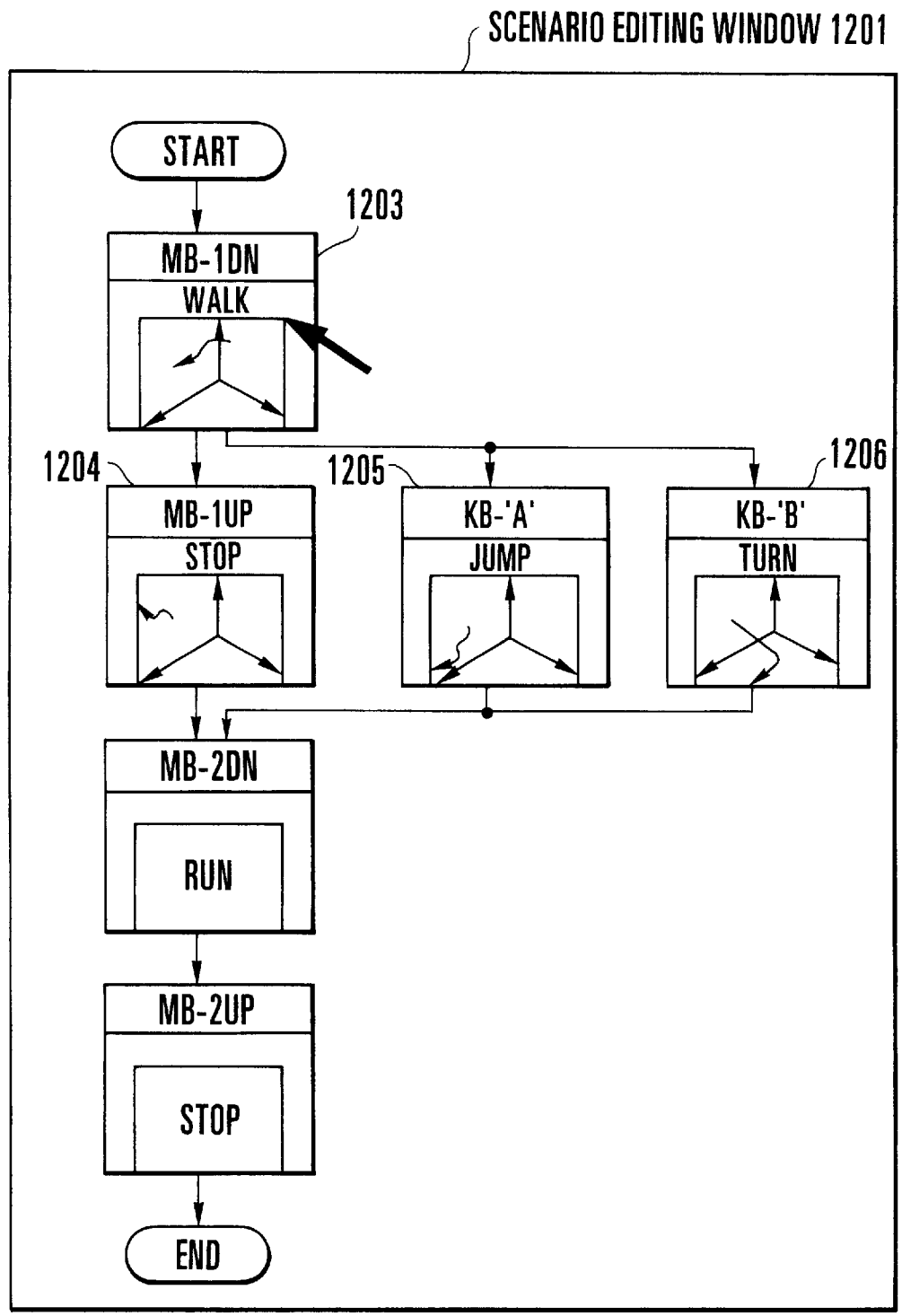

As shown in FIG. 12A, loci or rotations corresponding to the operation data for operation units 1203, 1204, 1205, and 1206 are displayed as 2D images together with the operation units in a window 1201 for the scenario editing section 53.

Figure 6:
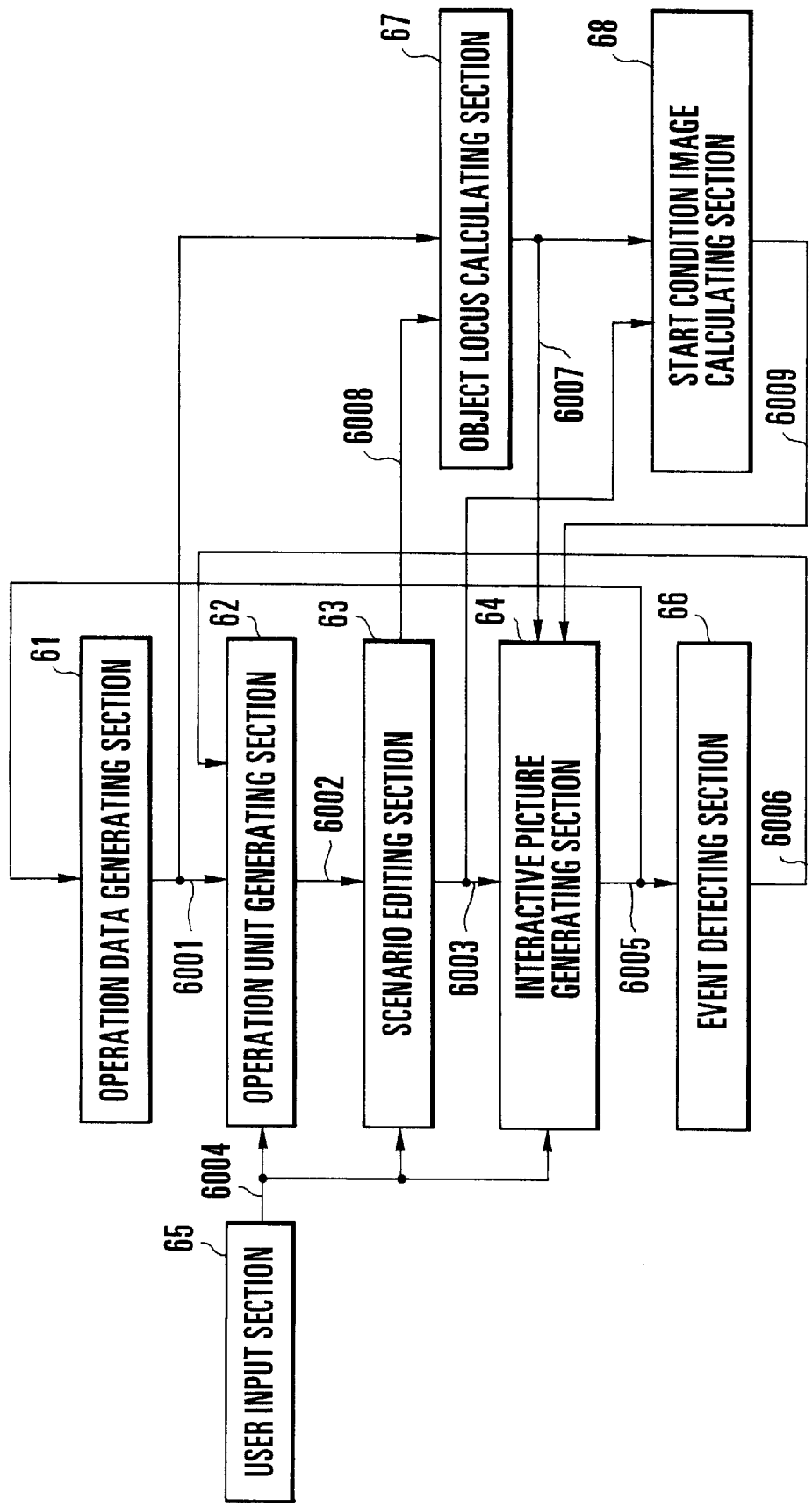
FIG. 6 is a block diagram showing an interactive picture presenting apparatus according to the sixth embodiment of the present invention.

FIG. 6 shows an interactive picture presenting apparatus according to the sixth embodiment of the present invention. The apparatus of the sixth embodiment is characterized in that a start condition image calculating section 68 is added to the apparatus of the fourth embodiment shown in FIG. 4. The start condition image calculating section 68 generates an image or icon for visualizing a start condition on the basis of the start condition of an operation unit 6002 in a scenario 6003 from a scenario editing section 63 and outputs a start condition image 6009 to an interactive picture generating section 64. The interactive picture generating section 64 displays an object locus 6007 near the locus generated as the picture on the basis of the object locus 6007 from an object locus calculating section 67. Reference numeral 61 denotes an operation data generating section; 62, an operation unit generating section; 65, a user input section; 66, an event detecting section, 6001, operation data; 6005, object position data; 6006, an event; and 6008, an editing index.

Referring to FIG. 12B, images or icons 1207a, 1208a, 1209a, and 1210a for visualizing the start conditions of the respective operation units are displayed near object loci 1207, 1208, 1209, and 1210 in a window 1202 for the interactive picture generating section 64.

FIG. 7 shows an interactive picture presenting apparatus according to the seventh embodiment of the present invention. The apparatus of the seventh embodiment is characterized with respect to the apparatus of the first embodiment in FIG. 1 in that an interactive picture generating section 74 generates and presents a picture on the basis of a user input 7004 from a user input section 75 and a scenario 7003 from a scenario editing section 73, and the index of the operation unit data under execution is sequentially output as an execution index 7006 to the scenario editing section 73.

The scenario editing section 73 performs an emphatic display such as reversal display or a change in luminance value of an operation unit 7002 under execution on the basis of the execution index 7006 and presents the emphatic display result to the user. At the same time, the scenario editing section 73 displays the execution result of operation data 7001 constituting the operation unit from an operation unit generating section 72 and sequentially displays the execution result to the user. Reference numeral 71 denotes an operation data generating section; and 7005, object position data. This embodiment is applicable to the second to sixth embodiments.

FIG. 8 shows an interactive picture presenting apparatus according to the eighth embodiment of the present invention. The apparatus of the eighth embodiment is characterized with respect to the apparatus of the seventh embodiment in FIG. 7 in that a condition for temporarily interrupting execution in an operation unit list is set in a scenario editing section 83 in advance, and when an execution index 8006 from an interactive picture generating section 84 satisfies the condition, execution control information 8007 for interrupting execution of an interactive animation is output to the interactive picture generating section 84. As an execution interruption condition determined by a user, execution of an arbitrary operation unit, execution of a count set loop in a repetition loop in an operation unit list, and the like are included.

When execution is temporarily interrupted by the execution control information 8007, the user checks the execution situation of the operation unit 8002 under execution, and refers to or updates various parameters such as a position in the space to which the actor belongs, and checks if the interactive animation is executed in accordance with the will of the user. The user then uses the execution control information 8007 to cause the interactive picture generating section 84 to restart the temporarily interrupted execution. Reference numeral 81 denotes an operation data generating section; 82, an operation unit generating section; 85, a user input section; 8001, operation data; 8003, a scenario; and 8005, object position data. This embodiment is also applicable to the second to sixth embodiments.

FIG. 13 shows the ninth embodiment of the present invention. In the ninth embodiment, the execution control of an interactive picture generating section 134 is performed by an event 13006 detected by an event detecting section 136 during execution of an interactive animation. Referring FIG. 13, the event detecting section 136 outputs the event 13006 to an operation unit generating section 132 and a scenario editing section 133. The scenario editing section 133 performs execution control of the interactive picture generating section 134 upon generation of an arbitrary event 13006 such as collision between actors, the lapse of a set time, or a user input. Reference numeral 131 denotes an operation data generating section; 135, a user input section; 13001, operation data; 13002, an operation unit; 13003, a scenario; 13004, a user input; 13005, object position data; 13007, an execution index; and 13008, execution control information.

As has been described above, according to a picture generating apparatus of the present invention, an event generated when a user generates operation data is detected, and a set of the detected event and operation data is automatically formed into an operation unit. A scenario is generated on the basis of the operation unit. For this reason, the number of steps for maintaining the correlation between the operations of actors and the start conditions can be zero, and an interactive animation can be generated with a smaller number of steps than that in the conventional case.

In scenario editing, motion data of an operation unit serving as a target object can be easily specified by an operation data generating section. At the same time, the start condition of an operation can be easily detected by the operation data generating section. Therefore, the correlation can be easily retrieved and recognized. Therefore, an interactive animation can be generated in a smaller number of steps than that in the conventional case.

What is claimed is:

1. An interactive picture presenting apparatus for presenting a series of pictures by arranging a plurality of objects in a space and generating images of the objects for each frame, comprising:

user input means for receiving a user input;

operation data generating means for generating operation data of the objects on the basis of layouts of the objects for each frame;

operation unit generating means for generating, on the basis of the user input from said user input means, an operation unit constituted by the operation data from said operation data generating means and a start condition of the operation data;

scenario editing means for generating, on the basis of the user input from said user input means, a scenario using the operation unit from said operation unit generating means and an execution order of operation units; and interactive picture generating means for calculating the layout of each object on the basis of the scenario from said scenario editing means and the user input from said user input means for each frame, generating a picture on the basis of the calculated layout of each object for each frame and geometric attributes of each object, and outputting a calculated layout of each object for each frame to said operation data generating means.

2. An apparatus according to claim 1, wherein said interactive picture generating means comprises a memory for storing the geometric attributes of each object.

3. An apparatus according to claim 1, further comprising event detecting means for detecting an event serving as the start condition of the operation of each object on the basis of the layout of each object for each frame from said interactive picture generating means and a real-time user input from said user input means, and outputting the event to said operation unit generating means; and wherein said operation unit generating means generates an operation unit on the basis of the event from said event detecting means and the user input from said user input means, and said interactive picture generating means outputs the attributes of each object, the calculated layout of each object for each frame, and the user input from said user input means to said event detecting means.

4. An apparatus according to claim 3, wherein said event detecting means comprises a memory for storing the geometric attributes of each object.

5. An apparatus according to claim 3, wherein said event detecting means detects at least one of collision between objects, a timeout, a message from another object, and the user input from said user input means.

6. An apparatus according to claim 1, further comprising object locus calculating means for calculating, on the basis of the operation data from said operation data generating means, a geometric attribute of each object which represents a locus of each object in a space or rotation about a coordinate axis, and outputting object locus information to said interactive picture generating means; and wherein said interactive picture generating means generates, on the basis of the object locus information from said object locus calculating means, a picture for visualizing movement of each object in the space or the rotation about the coordinate axis.

7. An apparatus according to claim 6, wherein said scenario editing means outputs an index of an operation unit serving as a target object for an editing operation to said object locus calculating means, said object locus calculating means outputs object locus information representing an emphasized operation designated by the index from said scenario editing means to said interactive picture generating means, and said interactive picture generating means visualizes the movement of each object in the space or the rotation about the coordinate axis on the basis of the object locus information representing the emphasized operation designated by the index from said scenario editing means.

8. An apparatus according to claim 6, further comprising motion feature image calculating means for calculating a motion feature image representing a feature of the locus of each object in the space or the rotation about the coordinate axis on the basis of the object locus information from said object locus calculating means, and outputting the motion feature image to said scenario editing means; and wherein said scenario editing means generates a scenario while presenting the motion feature image from said feature image calculating means.

9. An apparatus according to claim 6, further comprising start condition image calculating means for calculating a start condition image for the operation unit from said operation unit generating means on the basis of the scenario from said scenario editing means, and outputting the image representing the start condition to said interactive picture generating means; and wherein said interactive picture generating means visualizes the movement of each object in the space or the rotation about the coordinate axis on the basis of the object locus information from said object locus calculating means while presenting the start condition image from said start condition image generating means.

10. An apparatus according to claim 1, wherein said interactive picture generating means sequentially outputs an index of an operation unit under execution and an execution result of the operation unit to said scenario editing means, and said scenario editing means sequentially presents the operation unit under execution while distinguishing the operation unit under execution from other operation units on the basis of the index of the operation unit under execution from said interactive picture generating means, and sequentially presents execution results of operation data of the operation unit from said interactive picture generating means.

11. An apparatus according to claim 10, wherein said scenario editing means outputs, on the basis of the user input from said user input means, execution control information for setting temporal interruption or restarting of execution of the scenario to said interactive picture generating means, and said interactive picture generating means temporarily interrupts or restarts the execution of picture generation on the basis of the execution control information from said scenario editing means.

12. An apparatus according to claim 11, further comprising event detecting means for detecting an event serving as the start condition of the operation of each object on the basis of the layout of each frame for each frame from said interactive picture generating means and a real-time user input from said user input means, and outputting the event to said scenario editing means; and said scenario editing means outputs the execution control information in accordance with the event from said event detecting means.

13. An apparatus according to claim 1, wherein the geometric attributes of each object are stored in said interactive picture generating means and external storage means and is constituted by at least one of a luminance/material/shape of each object, a texture image, and a correlation between the shape of each object and the texture image.

\* \* \* \* \*